May 31, 1949. D. E. POST 2,471,701
POULTRY BAG
Filed April 12, 1946

INVENTOR
Durrel E. Post
BY Robb & Robb
ATTORNEYS

Patented May 31, 1949

2,471,701

UNITED STATES PATENT OFFICE 2,471,701

POULTRY BAG

Durrel E. Post, Gates Mills, Ohio

Application April 12, 1946, Serial No. 661,642

1 Claim. (Cl. 229—53)

My present invention has to do with the provision of means for facilitating the wrapping of live poultry such as chickens, ducks, or the like, as when vended from farmers' market places, or stands.

According to usual procedure, it is ordinarily necessary for a farmer, in selling live fowl, to tie the legs or feet of the fowl together first, and then wrap the fowl preliminary to delivering the same to a purchaser. The foregoing operation is one which consumes quite a little time usually, and I have observed that when purchasers of poultry have to stand in line or wait for a farmer or poultry seller to wrap up the live chicken, the delay causes the purchaser at times to move on to a next stand where more prompt service can be given, thereby causing loss of a sale or sales under certain conditions.

The object of my invention, therefore, has been to produce a special form of poultry bag provided with a head opening therein, and equipped with quick tying means for the open end of the bag to bind the latter about the legs of a fowl so as to enable the fowl or the like, in live condition, to be quickly introduced into the bag so that its head may be caused to protrude from the largely closed end of the latter, through a head opening, the bag being provided with quick tying or binding means for tying the normally open end of the latter around the feet or legs of the fowl for making prompt delivery of the latter to the purchaser.

The formation of my novel poultry bag is such that at its largely closed end equipped with the head opening, the bag is formed with a curvature to conform somewhat with the breast of the fowl, so that as the latter is slipped into the bag, previously disposed properly with its curved closed end portion in line with the breast portion of the fowl, the head of the fowl may be caused to be pushed right thrugh the head opening very quickly and the body of the bag immediately closed by binding the tying means around the feet of the chicken so as to enable very quick dispensing or selling of the wrapped poultry in live condition.

A full understanding of my new bag construction will be had upon reference to the following detail description, in conjunction with the accompanying drawing, in which Figure 1 is a view showing my poultry bag in use as when confining the body of the fowl therein, with the head of the fowl protruding through the head opening provided therefor, and with the closed end of the bag tied around the legs of the fowl in the manner in which the fowl will be delivered to the purchaser.

My construction of poultry bag is very simple, and, to some extent, follows that of the form of substantial paper bags made of heavier paper as commonly in use today.

Figure 2:
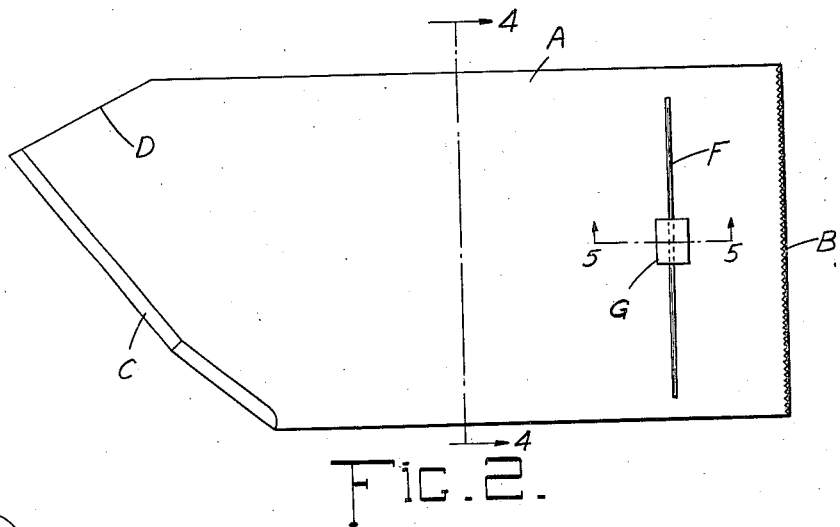
Figure 2 is a side elevation, or plan view, showing my formation of bag and tying means applied thereto, when the bag is in flat condition preliminary to being picked up, and preliminary to spreading its sides initially to the introduction of the live fowl into the bag.

The bag is made in generally rectangular form for the body A thereof, and is provided with the usual open end B for introducing the fowl thereinto. At the end portion opposite the open end B the bag is closed along the curved line somewhat as shown at C in the drawing, the closed end portion C extending nearly the entire width of the bag and at an angle to the lower edge of the bag as depicted in Figure 2, which angle is substantially obtuse. At the closed end C of the bag the latter is cut at an angle as shown at D in order to provide the head opening located at this point and seen best at E in Figure 3.

The body of the bag is preferably of a size to accommodate the introduction into the bag of a live fowl of relatively heavy poundage. However, it is to be understood that I may make my bag in different sizes so that the bag will accommodate spring or younger fowls, larger sizes of bags to accommodate more grown poultry.

Figure 3:
Figure 3 is a front end view of the bag in flat condition and showing the location or arrangement of the head opening.
Figure 4:
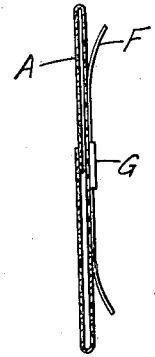
Figure 4 is a sectional view taken about on the line 4—4 of Figure 2.
Figure 5:
Figure 5 is a sectional view taken on the line 5—5 of Fig. 2.

Normally while the bag body A is in flat condition it will be of the form shown in Figures 2, 3, and 4.

Figure 1:
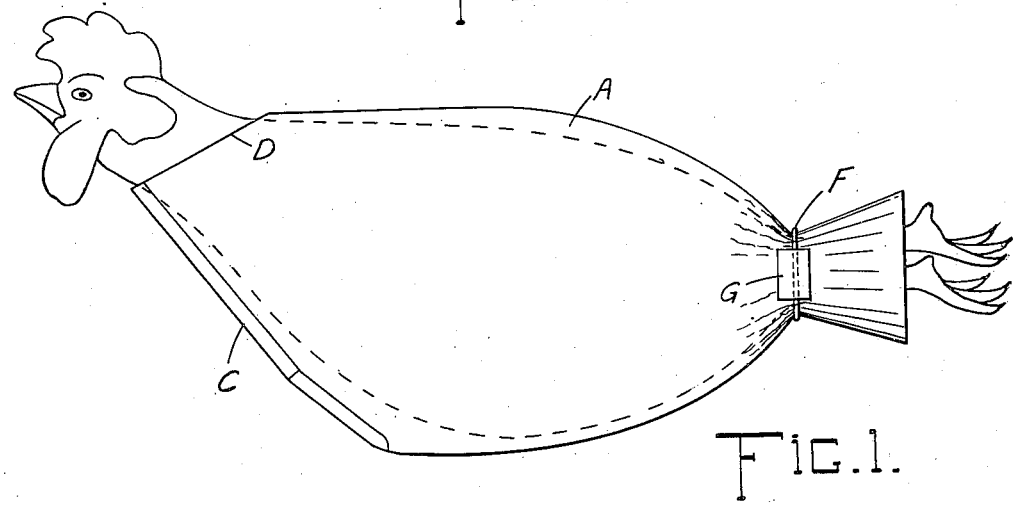

Now adjacent to the open end of the bag I attach a tying wire, or tape, or cord, generally designated at F, and which is held in place on the bag by a piece of adhesive paper or tape designated G, see Figures 1 and 2. The tie member F is arranged so that it may be quickly manipulated when the fowl has been introduced into the bag, so as to tie the open end of the latter around the legs of the fowl as seen in Figure 1.

In the use of my poultry bag invention, it is contemplated that when a purchaser selects a live fowl to take away, the vendor will grasp the open end portion B of the bag body A, flirt the bag in the air in the customary way so as to tend to inflate the same and separate the sides thereof, and, having grasped the fowl sold, by the legs, the vendor will push the poultry into the bag with the breast portion of the poultry in the generally closed end portion C of the bag. By so manipulating the bag and the fowl, the pushing of the latter toward the closed end C of the bag will slide the fowl with its head toward and through the head opening D of the bag and thus quickly emplace the fowl in the container. The body of the fowl will thus be comfortably enclosed in the bag, and as soon as introduced into the latter the vendor will crimp the open end of the bag at B around the legs of the fowl, or crumple the same around the legs, and thus tie the restricted end by means of the tie member F.

The use of my poultry bag in the manner above mentioned involves such a quick operation of bagging the poultry, that the fowl is emplaced in the bag with its head disposed through the opening D almost before the fowl is aware of its handling to the end of packaging the same. Also, the manner of emplacing the fowl in the bag involves an operation that only consumes a couple seconds after the legs of the fowl are grasped and held together, thus greatly facilitating the packaging or wrapping of the fowl in a comfortable manner, ready to be taken off by the purchaser.

Of course it is contemplated that the formation of the curved closed end portion of the bag A, as shown at C, may be slightly modified depending on the nature of the fowl being sold at a particular stand, but, generally speaking, the structure of the bag as I have described it above, will be suitable for bagging poultry of the different kinds customarily vended at farmer's stands or market places, or in stores that sell poultry.

Another advantage of my poultry bag structure lies in the fact that it is made so that the fowl enclosed therein, as to the body thereof, is comfortable and may be so quickly emplaced in the bag that it will not be frightened in the operation of wrapping up the same for vending.

Having thus described my invention, what I claim as new and desire to secure by Letters Patent of the United States, is:

As a new article of manufacture, a poultry bag comprising a bag of generally oblong form and open at one end, the opposite end of the bag having two converging edge portions of different length, the edge portion of shorter length being open to provide a small head opening through which the head of a fowl, inserted head-first into the bag through the open end thereof, may pass, the edge portion of longer length being closed and shaped to fit the breast of a fowl whose body is received in the bag with its head extending through the head opening, and a tie member permanently attached to the bag adjacent to the open end to wrap about and clamp the open end portion of the bag about the legs of a fowl so that the latter is held with its breast against the closed edge portion and its head protruding through said head opening.

DURREL E. POST.

REFERENCES CITED

The following references are of record in the file of this patent:

UNITED STATES PATENTS

| Number | Name | Date |
|---|---|---|
| 1,206,280 | Williams | Nov. 28, 1916 |
| 1,493,137 | Williams | May 6, 1924 |
| 1,933,793 | Douglas | Nov. 7, 1933 |
| 2,234,794 | Arzet et al. | Mar. 11, 1941 |